Nov. 13, 1962 J. C. LONG 3,063,183

TELEPHONE ATTACHMENT DEVICE

Filed Sept. 9, 1957

INVENTOR
JOHN C. LONG

BY Strauch, Nolan & Neale
ATTORNEYS

United States Patent Office 3,063,183

Patented Nov. 13, 1962

3,063,183

TELEPHONE ATTACHMENT DEVICE

John C. Long, 90 Broad St., Charleston, S.C.

Filed Sept. 9, 1957, Ser. No. 682,749

8 Claims. (Cl. 40—336)

This invention relates to attachments for telephones and particularly to devices bearing identification data that are mounted on the telephone in association with circuit selector push buttons.

It is the major object of the present invention to provide a novel telephone attachment device which has a portion modified for ready mounting and dismounting in association with the usual circuit selector buttons and at least one transparent window through which a card or the like bearing data relating to such circuits is displayed to the telephone user.

A further object of the invention is to provide a novel telephone attachment device consisting essentially of a mounting flange formed for ready mounting and dismounting with respect to a telephone, and a special depending data card or like receptacle portion having a normally vertical transparent front window.

It is a further object of the invention to provide a novel attachment device for a telephone having a flexible operable front window.

Further objects will appear as the description proceeds in connection with the appended claims and the annexed drawings wherein:

Figures 1, 2, 3, 4:
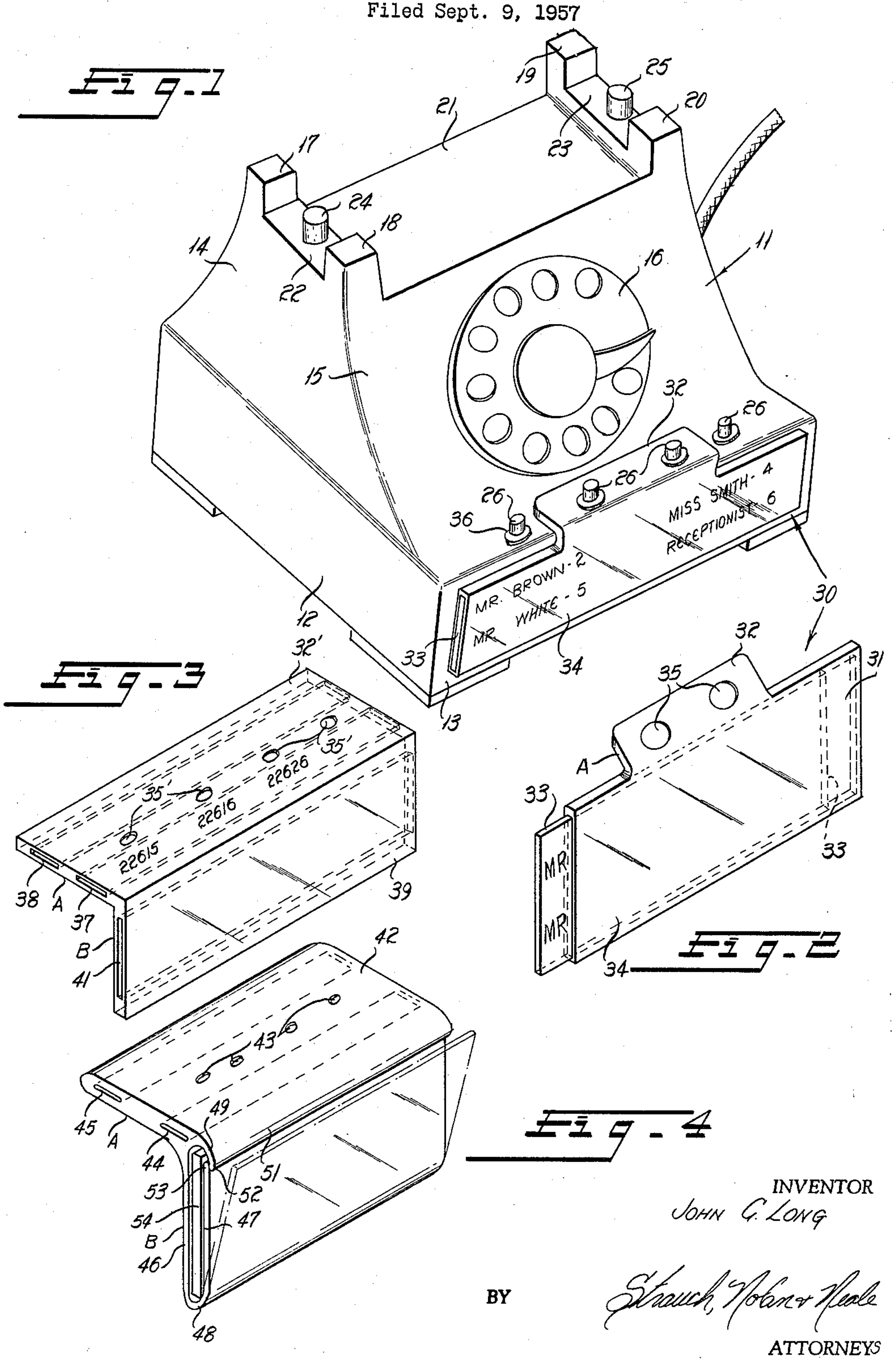
FIGURE 1 is a perspective view of a telephone set (receiver and transmitter unit omitted) with an attachment according to the invention.
FIGURE 2 is a perspective view of the attachment of FIGURE 1 apart from the set.
FIGURE 3 is a perspective view of another form of attachment.
FIGURE 4 is a perspective view of another attachment having a snap-open front window.

FIGURE 1 illustrates the usual desk-type telephone 11 comprising a generally rectangular base 12 having a vertical front face 13, an upstanding housing 14 having an inclined front face 15 on which the usual rotatable dial 16 is mounted and a top cradle section consisting of laterally aligned yoke arms 17, 18 on one side and 19, 20 on the other side and a flat generally horizontal top housing surface 21 between the yokes.

Disposed between the lower ends of arms 17 and 18 is a flat surface 22, and a similar surface 23 is disposed between the lower ends of arms 19 and 20. Surfaces 22 and 23 are parallel and laterally aligned in the same plane a short distance above the level of surface 21. Similar switch buttons 24 and 25 project slidably up from surfaces 22 and 23 respectively, and when the usual transmitter-receiver unit is placed across the yokes when the telephone is not in use its weight holds these buttons depressed and surfaces 22 and 23 effectively cradle the unit.

At the lower end of surface 15 where it merges into the base, many business telephones are provided with a plurality of upstanding switch push buttons 26 for selectively connecting the telephone into different circuits. These may be outside trunk lines, each having a number usually listed in the telephone book, or may be interoffice numbers associated with only certain outside lines for example.

The present invention provides a readily attachable and detachable device for presenting identification data relative to these push buttons and the circuits they represent so that the information is clearly presented to the telephone user and does not interfere with his use of the telephone, and wherein the identification material may be readily and quickly changed.

This device in FIGURES 1 and 2 takes the form of an essentially integral transparent stiff plastic member 30 consisting of a receptacle section 31 and a mounting section 32. The receptacle section is a hollow open-ended tube of essentially thin rectangular cross section adapted to slidably frictionally receive a card 33 bearing on its front surface the identification material such as interoffice names and numbers indexed or otherwise related to the push buttons, this material to be viewed through the transparent front face window 34. At each end this tube appears as a slot.

The mounting section 32 consists of an angularly related flange or lip pierced with apertures 35 adapted to fit over at least two of the push buttons 26. In practice each push button 26 emerges from a shallow surface boss 36 and each aperture 35 may be sized to tightly fit over it as shown. Alternatively aperture 35 may more closely fit the button 26 sufficiently to hold the device on the telephone but not interfering with the push button operation. The angle between the receptacle section 32, which in the operative position lies flat and vertical against front body face 13, and lip 32 is at least 90° and usually slightly more to conform to the slope of adjacent surface 15.

FIGURE 3 shows a further form of the device which also is of general L-shape but the flange portion 32′ is here formed with four apertures 35′ to fit over the respective selector buttons 26 and provided with parallel longitudinal slots 37 and 38 into which may be inserted cards bearing indicia indexing with and relating to the circuit controlled by that button. For example the inserted card in slot 37 may bear the outside line designations.

Depending from flange 32′ is a receptacle portion 39 having a through slot 41 adapted to receive an interoffice data card as in FIGURE 1.

A further embodiment is shown in FIGURE 4 wherein the mounting flange 42 is apertured at 43 to fit over the selector buttons and longitudinally slotted at 44 and 45 to receive data bearing cards. Instead of an open-ended slot, this embodiment provides a snap-open type of enclosure for the interoffice data card and comprises a straight depending leg 46 adapted to lie flat against the telephone body face 13, a parallel leg 47 integrally joined to the bottom of leg 47 at 48 so as to be flexibly hinged thereto, and an overhanding rim 49 having a rounded outer edge surface 51 and a downturned lip 52 under which the free upper end 53 of leg 47 is adapted to spring and be held to retain a card indicated at 54. When card 54 is to be replaced leg 47 is flexed to release it from ledge 51 and open up the card receiving slot in the depending receptacle portion.

In all forms of the invention the surface B is essentially flat and in close contact with vertical body face 13, and surface A is inclined and curved slightly to conform to the contour of adjacent body surface 15. In all embodiments the cards or other indicia bearing members in the slots at 31, 37, 38, 41, 44, 45 and at 54 are visible through the vertical transparent panels of the device. The different forms of the device are preferably made of suitably formed heat-bonded lengths of transparent thermoplastic material so as to provide in each a unitary essentially integral construction.

If desired according to another embodiment, instead of inserting the indicia card 33 into a transparent slotted section 31, I may provide section 31 as a solid transparent member and bond upon its rear face, as by a suitable adhesive, a card or paper strip like 33 bearing the indicia to be visible through the transparent window. This indicia bearing member would be protectively enclosed between section 31 and the front face 13 of the telephone base.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A unitary telephone attachment device for ready mounting upon and removal from a standard type inter-office or like telephone comprising an upright portion that is longitudinally slotted to removably receive an indicia bearing card or the like and having a front transparent window through which said indicia is viewed and a rearwardly extending mounting portion projecting at an angle of ninety degrees or more from the upper end of said upright portion, said mounting portion being formed with a plurality of spaced laterally aligned apertures adapted to fit over bosses on the telephone through which extend circuit selector push buttons associated with the indicia on said card, and said device being supported substantially entirely on said telephone by said mounting of said apertured mounting portion on said bosses.

2. The device defined in claim 1, wherein said mounting portion is shaped to conform to the sloping curved adjacent surface of the telephone.

3. The device defined in claim 1, comprising an integral bonded relatively stiff plastic assembly.

4. The device defined in claim 1, wherein at least one additional longitudinal slot is provided in said mounting portion to receive another indicia bearing card or the like.

5. The device defined in claim 1, wherein said upright portion has a transparent front wall serving as said window flexibly hinged along a horizontal edge thereof, and an overhanging ledge along the other horizontal edge for holding the free end of said wall upright to define said slot.

6. A unitary dial desk telephone attachment device for ready mounting upon and removal from a standard type inter-office or like telephone made essentially of bonded plastic members comprising a thin flat tubular open-ended portion having a transparent front window and adapted to be disposed along the vertical front lower surface of a desk telephone base, and a rigidly extending upper flange portion having a plurality of apertures adapted to fit over bosses on the telephone base through which extend circuit selector push buttons disposed between said surface and the usual dial, said device being supported substantially entirely on said telephone by said mounting of the apertured upper flange on said bosses.

7. The device defined in claim 6 wherein a data bearing slide element is mounted in said tube so that the data is visible through said window.

8. A unitary flexible telephone attachment device for ready mounting on and removal from a standard type inter-office or like telephone comprising an upright transparent window section adapted to mount an indicia bearing member to be view therethrough, and a rearwardly extending mounting portion integral with its upper edge and formed with a plurality of spaced apertures for removably mounting said device upon bosses on the telephone base through which extend circuit selector push buttons associated with the indicia on the said member said device being supported substantially entirely on said telephone by said mounting of said aperture mounting portion on said bosses.

References Cited in the file of this patent

UNITED STATES PATENTS

| | | |
|---|---|---|
| D. 83,329 | Loeffler | Feb. 17, 1931 |
| Re. 18,462 | Johonning | May 17, 1932 |
| 884,573 | Detmers | Apr. 14, 1908 |
| 1,247,614 | Ayers | Nov. 27, 1917 |
| 2,338,757 | Curran | Jan. 11, 1944 |
| 2,409,814 | Vargish | Oct. 22, 1946 |
| 2,624,965 | Griswold | Jan. 13, 1953 |